United States Patent
Tyurumov et al.

(10) Patent No.: US 10,044,801 B1
(45) Date of Patent: Aug. 7, 2018

(54) BACKUP OF USER DATA WITH VALIDITY CHECK

(71) Applicant: Acronis International GbmH, Schaffhausen (CH)

(72) Inventors: Alexey Tyurumov, Moscow (RU); Stanislav S. Protassov, Moscow (RU); Serguei M. Beloussov, Singapore (SG); Mark Shmulevich, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 339 days.

(21) Appl. No.: 14/948,868

(22) Filed: Nov. 23, 2015

(51) Int. Cl.
*G06F 15/16* (2006.01)
*H04L 29/08* (2006.01)

(52) U.S. Cl.
CPC ...... *H04L 67/1095* (2013.01); *H04L 67/1097* (2013.01)

(58) Field of Classification Search
CPC ................. H04L 67/1075; H04L 67/1097
USPC .................................. 709/219, 224
See application file for complete search history.

(56) References Cited

U.S. PATENT DOCUMENTS

| | | | |
|---|---|---|---|
| 8,966,318 B1* | 2/2015 | Shah | G06F 11/3664 714/28 |
| 9,032,414 B1* | 5/2015 | Dalal | G06F 9/50 711/162 |
| 9,645,892 B1* | 5/2017 | Patwardhan | G06F 11/1466 |
| 9,804,957 B1* | 10/2017 | Chopra | G06F 11/3692 |
| 2006/0106838 A1* | 5/2006 | Ayediran | G06F 17/30067 |
| 2011/0153571 A1* | 6/2011 | Walker | G06F 11/1435 707/654 |

* cited by examiner

*Primary Examiner* — Philip B Tran
(74) *Attorney, Agent, or Firm* — Arent Fox LLP; Michael Fainberg

(57) ABSTRACT

A data backup application checks validity of data being backed up during an incremental or a full backup. In case of the file backup, the full backup checks the validity of data during the backup, because in case of data corruption the user will not have any original data since no data has been backed up yet. In case of the incremental backup, only the new files or the files that have changed compared to the last backup are now backed up. All new and modified files can be checked for validity by comparing internal format of the user files against a corresponding file format standard. If corrupted files are detected among the modified files, the user is notified.

19 Claims, 5 Drawing Sheets

BACKUP OF USER DATA WITH VALIDITY CHECK

FIELD

The present disclosure relates to a method for backup and recovery, and more particularly, to backup of user data with a validity check of the data being backed up during an incremental or a full backup.

BACKGROUND

When a user works with a computer (or a mobile device), he periodically backs up his personal data, such as collections of user pictures. However, before a backup of a large picture collection, some pictures (files) may get corrupted without the user knowing about it. This may occur due to viruses, because of hardware damages, because of data transmission errors, etc. When a backup starts, the data is already corrupted, and the corrupted data can unintentionally replace normal data on the storage/cloud, etc. In case of several hundreds or even thousands of pictures, a user will not be able to go over every single backed up picture to make sure it is not corrupted. The user files may get corrupted as a result of errors within the backup application, because of disk errors or due to malware.

Regardless of the cause, the pictures or files may become completely or partially un-viewable or un-readable. The undetected corrupted pictures will be stored in the disk backup until expiration of the backup retention period (e.g., approximately a year). After the expiration of the backup retention period all file archives (i.e., pictures) are deleted from the disk and the corrupted picture copies are left in the backup without a possibility of restoration of the original pictures. Then, the corrupted pictures can be backed up over and over and the user will never be able to find the originals. The conventional backup solutions do not check for validity of data being backed up during an incremental backup or a scheduled full backup.

Accordingly, an efficient method for backup and recovery of user data, which determines validity of data being backed up during an incremental backup or a scheduled full backup user, is desired.

SUMMARY

Accordingly, the present disclosure is directed to a method for backup and recovery of personalized user data that substantially obviates one or more of the disadvantages of the related art.

In one aspect of the disclosure, a data backup application checks validity of data being backed up during an incremental or a full backup (i.e., any backup after the initial backup). In case of the file backup, the full backup checks the validity of data during the backup, because in case of data corruption the user will not have any original data since no data has been backed up yet. In case of the incremental backup, only the new files or the files that have changed compared to the last backup are now backed up. According to an exemplary embodiment, all modified files are checked for validity. If corrupted files are detected among the modified files, the user is notified.

Additional features and advantages described in the disclosure will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the disclosure and are incorporated in and constitute a part of this specification, illustrate aspects of the disclosure and together with the description serve to explain the principles of the disclosure.

DETAILED DESCRIPTION

Figure 1:
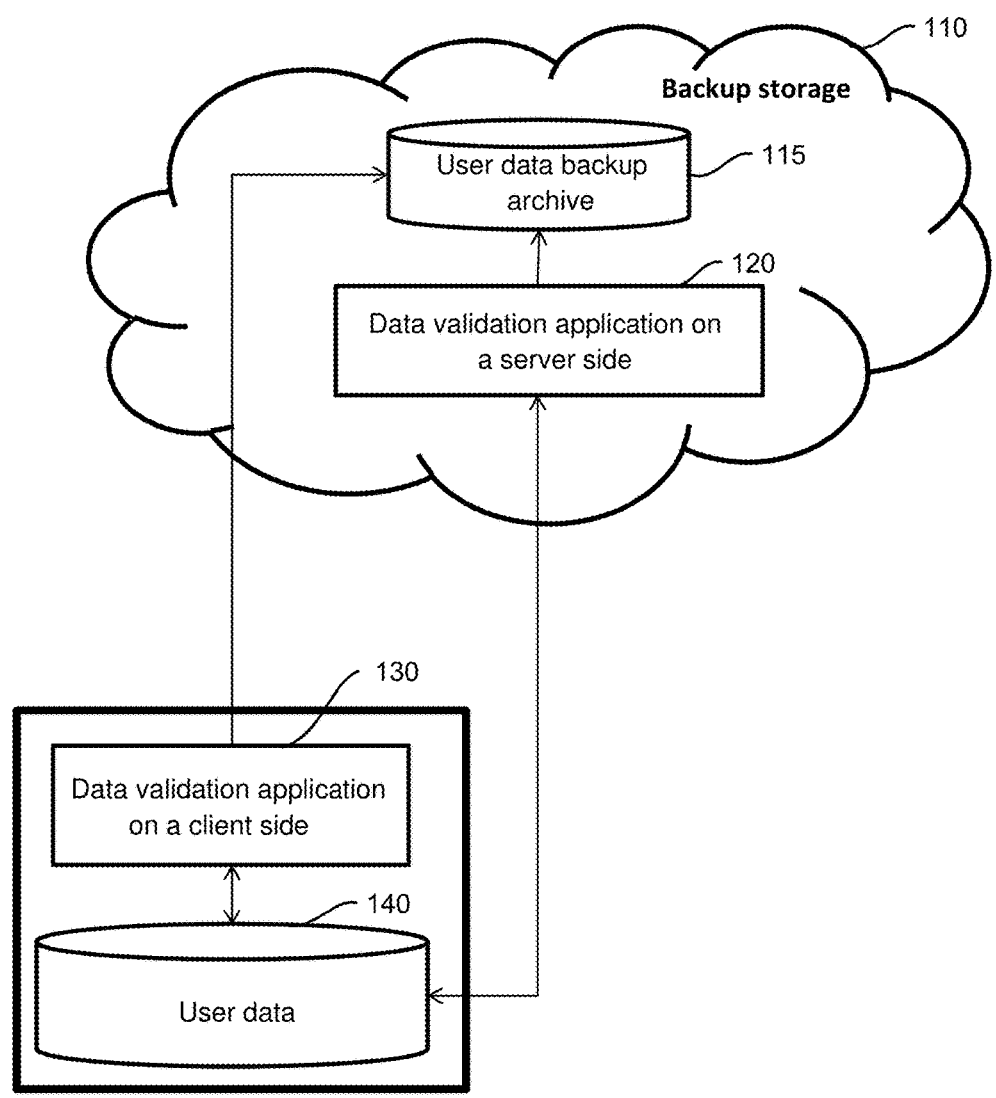
FIG. 1 illustrates architecture of a backup validation system in accordance with an exemplary aspect of the present disclosure.

Reference will now be made in detail to aspects of the present disclosure, examples of which are illustrated in the accompanying drawings.

In one aspect, a data backup application checks validity of data being backed up during an incremental or a full backup. In case of the full backup, the full backup checks the validity of data during the backup, because, in case of data corruption, the user will not have any original data since no data has been backed up yet. In case of incremental backup, only the new files or the files that have changed compared to the last backup are now backed up.

According to an exemplary aspect, all modified files are checked for validity. If corrupted files are detected among the modified files, the user is notified. The corrupted files are detected by comparing their format parameters against known format structure. Thus, the user can restore the corrupted files from the original copy prior to finding the un-viewable pictures himself, when it is too late.

According to the exemplary aspect, the files are checked against their corresponding format standards. For example, files ".zip," ".doc," ".jpg," ".rtf," ".avi" have a particular format described in file standard documents. The backup application checks the files for partial or complete correspondence to the file standards. For example, the backup application checks that the ".jpg" file has all required headers, ".zip" archive has correct control sums of blocks, the ".doc" files have correct structure, etc. Generally, any predefined types of files can be validated. A validation application can include, in theory, any validation rules, so a user or administrator can "teach" the software to check any formats of files.

For example, a corrupted TIFF file can be detected by analyzing the following parameters:

1. End of File Marker.

The end of file (EOF) file stream marker is a good indicator. Often, graphics files are truncated due to errors in transmission or due to a failed write operation to a disk. In such cases, when the file is read, the EOF will occur much sooner than a file format reader would have expected, and corruption of the file can be detected. Also, read operations will fail, if there is an actual error in the file system or disk. The validation module always checks the return value of the read operations. An unexpected EOF, or any file stream error, is normally a sign that something is wrong with the file.

2. Unexpected Characters.

Missing or excessive data may cause an improper alignment of the internal structures of a file format. Data structures in memory often contain invisible 2- or 4-byte boundary padding between structure elements that may unintentionally be written to a file. Data written to a file opened in text mode, rather than in binary mode, may contain embedded carriage return and/or linefeed characters and may therefore create bad data.

3. Value Errors.

Stream-oriented formats divide stored data into individual sections called segments (blocks, chunks, etc.), each of which begins with a specific identification or a "magic" value followed by the length of the data in the segment. If a format reader reads in an entire segment and discovers that the next data in the file is not the expected magic value of the following segment (or the end of data stream marker), then the reader assumes that the data is bad or corrupted.

4. Out-of-Range Offset Values.

File-oriented formats, typically, use fixed-size data structures and absolute offset values to locate data. An offset value that points outside the file space is usually an indication that the offset value is wrong, or the file has been truncated. If internal file structure does not match the file format standard, the user is notified that the data is corrupted.

According to the exemplary aspect, the file metadata is used for validation of the file. This metadata can be represented by checksums of file sectors, file headers containing file size and links to other file sectors that do not have correct data, pointers to encrypted file sectors, etc.

The image data is recorded in the file header in the case of ".jpg" file, for example. The file image data can be decoded and if the resulting image does not correspond to the data in the header, that means that the file is corrupted. For example, if the image size is larger than the size indicated in the header, the file is definitely corrupted. In case of data contained in database tables, the format of a data field can be compared against the actual data format. If these formats do not match, the user is alerted, so he can check the data manually. In case when a corrupted file is detected and a user does not have a consistent copy of this file for some reason, the user is notified and offered to acquire third-party file restoration tools for repairing files of a particular type.

In one aspect, consistency of files is checked before creating a backup on the cloud. The application file consistency is usually provided by MICROSOFT™ VSS solution. The application file consistency is implemented by applications releasing the files to the disk during the backup. However, not all applications are designed to do this. Therefore, in the exemplary aspect, if some cloud backups are deemed to contain inconsistent data, the previous backups are not deleted so the application data can be restored from these backups regardless of user's backup settings.

In one aspect, the only certain types of files are checked for their validity in order to optimize the backup process, because each type of files requires its own algorithm. Thus, the files presenting the most interest to a user are checked—e.g., documents (".doc," ".rtf," ".xls," ".odt"), pictures/video files (".avi," ".mpeg," ".jpg," ".png," etc.) and editor projects (".pst," ".cdr").

According to the exemplary aspect, the file validity can be checked during a client side backup process. Alternatively, the file validity can be checked during a periodic data backup on a cloud. In case of encrypted user files, the file validity is checked only on the user side, or, alternatively, on the cloud if the user provided the password or key to the cloud-side application. All files modified by the user are detected. These files can be located on user's mobile device and/or computer system. The files can be modified by user actions indirectly. The detected modified files can be checked for validity and written into storage fully or incrementally. This can be done after each user action or periodically. The backup files can be encrypted using a private key known only to the user and stored on cloud storage. Note that if the files are encrypted, the validation cannot be performed on the server side. This can only be done on the side of the client who has the encryption key to the encrypted files.

In case of a backup of a corporate system database, a basic database snapshot can be validated prior to backup in order to create a fully restorable database backup. The validation of a binary format of the snapshot can be used. In this scenario a backup cloud service is used. In one aspect, a user can declare a folder to be un-editable. For example, if the user loads a collection of pictures in a folder, this folder can be marked as un-editable because they user does not edit the ".jpg" files. Then, if any of the files are modified in this folder, the backup application can detect prior to the backup and can notify the user. This way, the user can restore his pictures from a previous backup.

FIG. 1 illustrates architecture of a backup validation system in accordance with the exemplary aspect. According to the exemplary aspect, a validation application can run locally on a user device or can be installed and executed on a server side. A user data backup archive 115 is located on backup storage cloud 110. In one aspect, the data validation application 130 runs on the client side and validates the user data 140 prior to saving it into the user data backup archive 115. In another aspect, the user data 140 is sent to the backup storage cloud 115 and is validated by the server side validation application 120 prior to being saved into the user data backup archive 115.

Figure 2:
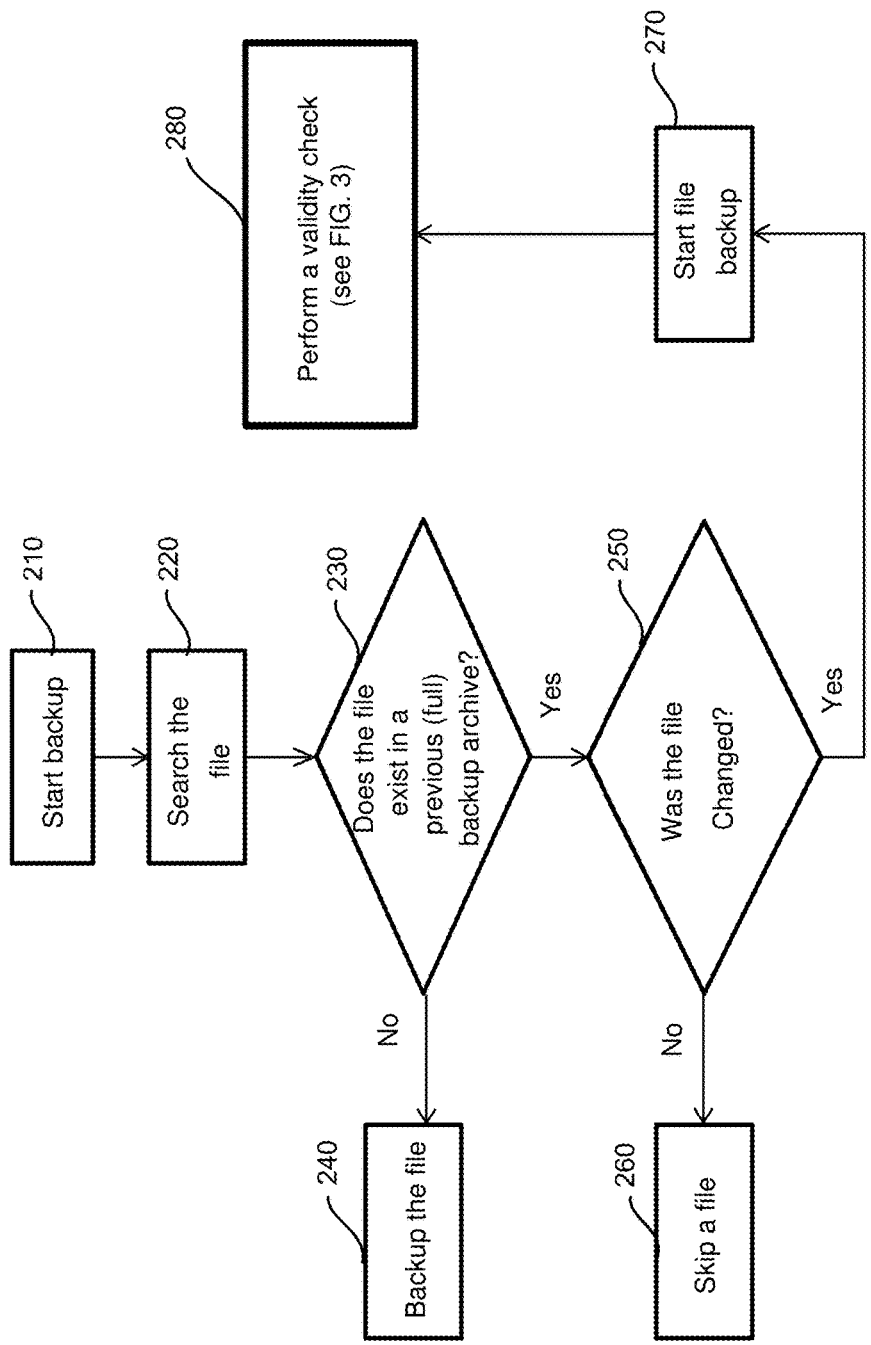
FIG. 2 illustrates a flowchart of a method of backup with validity check, in accordance with an exemplary aspect of the present disclosure.

FIG. 2 illustrates a flowchart of a method of backup with validity check, in accordance with the exemplary aspect. In step 210, backup is started. The process searches for a file to be backed up in step 220. The process determines if the file is found in a previous full backup archive in step 230. If the file is not found, the file is backed up in step 240. Otherwise, the process checks if the file has been changed in step 250. If the file has not been changed, the backup process skips the file in step 260. Otherwise the file backup is started in step 270. Then, the validity of the file is checked in step 280.

Figure 3:
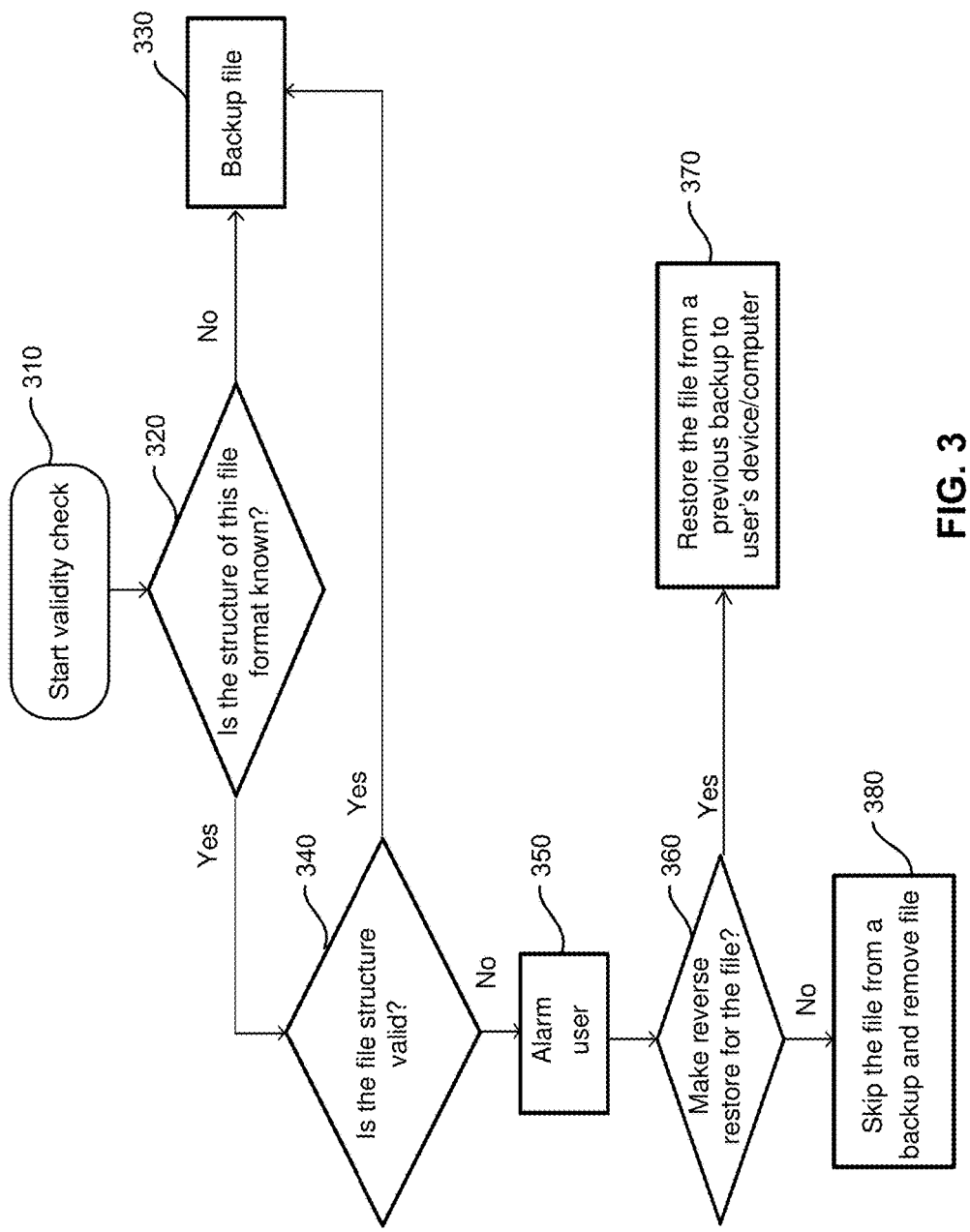
FIG. 3 illustrates a flowchart of a validity check, in accordance with an exemplary aspect of the present disclosure.

FIG. 3 illustrates a flowchart of a file validity check, in accordance with the exemplary aspect. The validity check is started in step 310. The validation process checks if the structure of this file format is known in step 320. If the structure is unknown, the file is backed up in step 330. Otherwise, the process checks if the structure is valid in step 340. If the structure is deemed valid, the file is backed up in step 330. If the structure is not valid, the process alarms the user in step 350. Then, in step 360, the process checks if the reverse restore can be made for the file. If the reverse restore operation is possible, the process restores the file from the previous backup to the user device in step 370. Otherwise, the process skips the file from backup and removes it in step 380.

According to the exemplary aspect, if a "reverse" restore can be made, this means that when the user data is backed up, the corrupted file is not backed up to the backup storage. Instead, the file is taken from storage and is placed onto the user device for a user to make a decision. Additionally, not only the known file formats can be validated, but any pre-defined collections of the files that user considers as "unchangeable." For example, a user can point to any directory and mark it as a "collection." If any files there are corrupted, the user is informed and the initial state of the collection can be restored.

Figure 4:
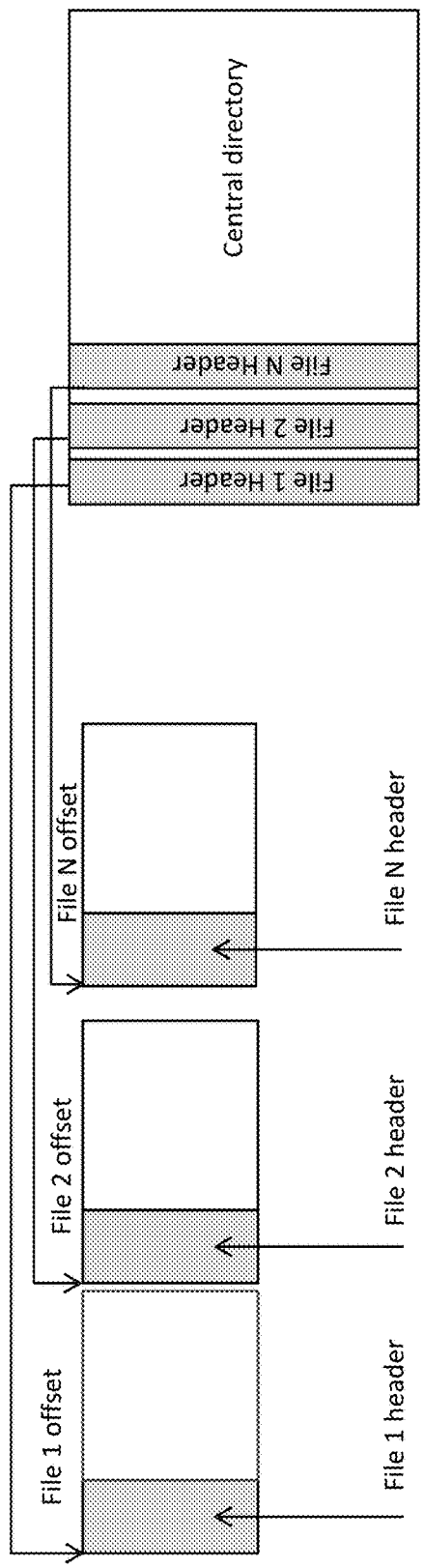
FIG. 4 illustrates how corrupted file structure is deleted, in accordance with an exemplary aspect of the present disclosure.

FIG. 4 illustrates how the corrupted file structure is deleted, in accordance with the exemplary aspect. In one exemplary aspect, the integrity of the file structure can be validated based on Zip file format:

1. Any Zip file contains a special metadata called a "central directory." This metadata includes all the information about a number of files zipped, their headers, file offsets and check sums;

2. If any corruptions inside the Zip file occur, they can be detected by comparing central directory information against the real file;

3. E.g., if a piece of any file was lost, the file offset does not match with the data placed into the central directory;

4. Zip file format is a good example, because it is used for internal data compression in many other types of files, such as ".doc" files. More generally, the concept is applicable to other Microsoft Office documents, such as, for example, docx, xlsx, pptx, etc. Similarly, the concept is applicable to any XML-based Microsoft Office files, Open Office documents (.odt) and others, PDF files, including PDF files that use ZIP compression together with other formats.

Many programming languages have special dedicated functions and methods that can help to validate most popular file formats. For example, in programs written in JAVA, there is JPEGImageDecoder function, which allows to detect if a JPEG file is corrupted.

Any common methods, including open source methods, or a dedicated application with algorithms created on demand can be used.

Figure 5:
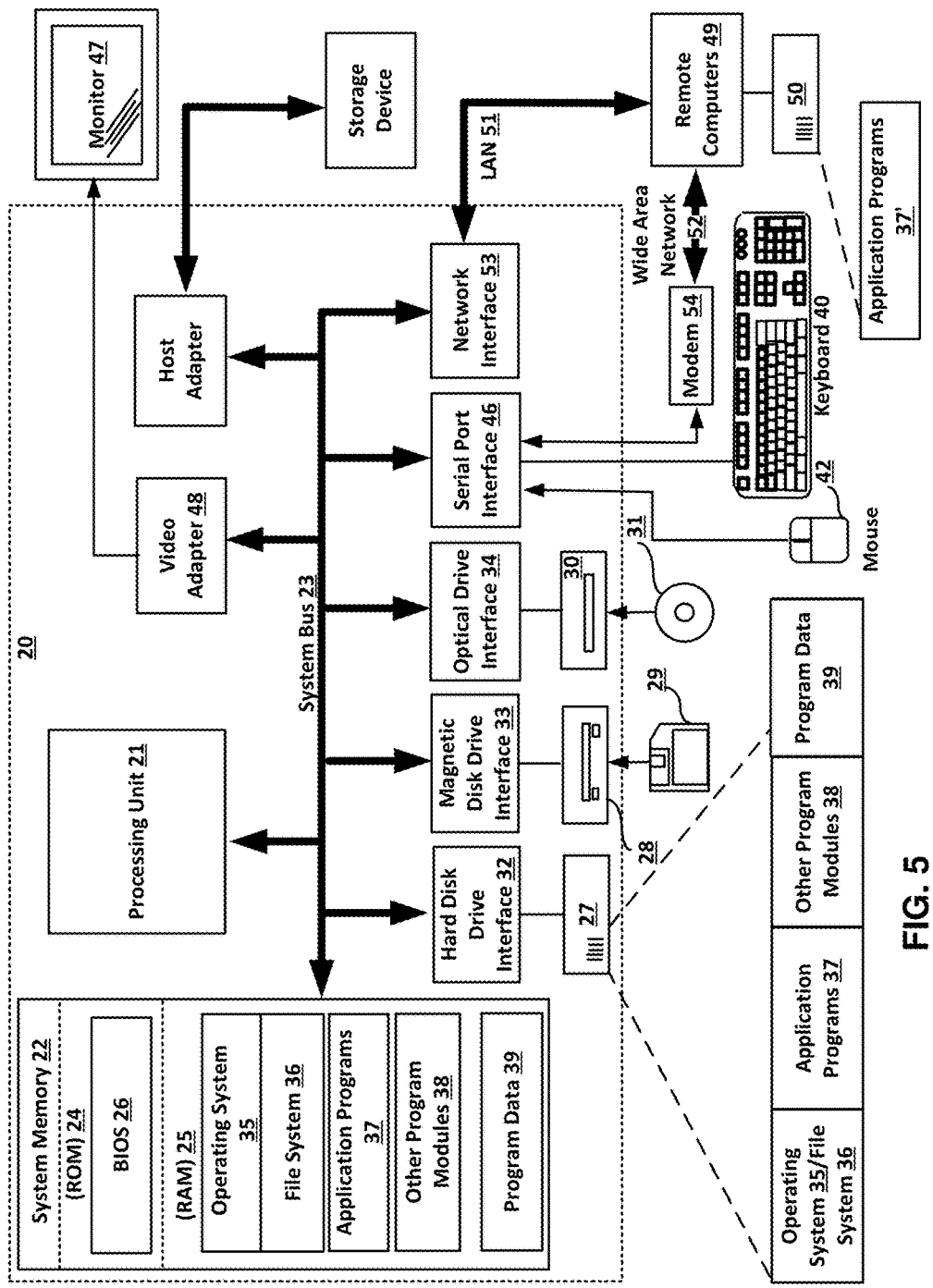
FIG. 5 illustrates an exemplary computer system that can be used for implementing the invention.

With reference to FIG. 5, an exemplary system for implementing the disclosure includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred aspect, it should be apparent to those skilled in the art that certain advantages of the described method and system have been achieved. It should also be appreciated that various modifications, adaptations, and alternative aspects thereof may be made within the scope and spirit of the present disclosure. The disclosure is further defined by the following claims.

What is claimed is:

1. A system for backup and validation of user data, the system comprising:
   a user device having an internal memory for storing user data items;
   and
   a backup component running on the user device configured to continuously track additions and modifications of the user data items on the user device,
   wherein:
      the backup component is configured to validate user data items prior to saving the user data items into the backup by comparing an internal format of the user data items against a corresponding file format standard;
      the backup component is configured to notify a user, if a user data item inconsistent with the file format is detected, and the user is offered to acquire third-party file restoration tools for repairing the user data item; and
      the backup component is configured to determine whether a reverse restore operation can be performed when the user data item is inconsistent with the file format, and
      the backup component is configured to, after user confirmation, replace the user data item with an uncorrupted backup of the data item is available in cloud storage accessible by the user device, the cloud storage configured to store backed up user data items.

2. The system of claim 1, wherein the backup component also detects changes in user files marked as un-editable and notifies the user.

3. The system of claim 1, wherein the user data items are any of:
   images;
   video;
   documents; and
   editor projects data.

4. The system of claim 1, wherein the reverse restore operation skips a backup of a corrupted file to the cloud storage and places the file onto the user device for a user to make a decision regarding deletion or restoring of the file.

5. The system of claim 1, wherein the backup component is configured to validate a pre-defined collection of files marked by a user as "unchangeable".

6. The system of claim 5, wherein if any files within the collection are corrupted, the backup component informs a user and restores an initial state of the collection.

7. The system of claim 1, wherein a validation component connected to the backup component is running on the cloud storage.

8. The system of claim 1, the backup component being further configured to:
   check consistency of the user data item before the backup.

9. The system of claim 8, the backup component further configured to:
   determine whether the backup contains inconsistent data and preventing deletion of the user data item; and
   restore the user data item from the backup despite user backup settings.

10. The system of claim 1, wherein the backup component is further configured to:
    prior to validating the user data items, encrypt the user data items on the user device using a private key prior to storing in the backup.

11. A method for validation of user data prior to backup, the method comprising:
    continuously tracking additions and modifications of user files on a user device by a backup component running on the user device;
    selecting a file for backup if a structure of a file format is known;
    checking if the structure of the file is valid prior to saving the file for backup;
    backing up the file if the structure of the file is valid;
    alerting a user, if the structure of the file is invalid,
    determining whether a reverse restore operation can be performed when the user data item is inconsistent with the file format, wherein the reverse restore operation restores the file from a previous backup to the user device;
    offering the user to acquire third-party file restoration tools for repairing the file;
    skipping a backup of the file and removing the file if the reverse restore operation is not available.

12. The method of claim 11, further comprising restoring the file from a previous backup to the user device for making a decision regarding deletion or restoring of the file by the user.

13. The method of claim 11, wherein a file structure element used for validation of the file comprises any of:
    a file header;
    file offsets; and
    a file checksum.

14. The method of claim 11, further comprising validating the file on a user device if the file is encrypted.

15. The method of claim 11, further comprising acquiring an encryption key from the user device and validating the file on a cloud server.

16. The method of claim 11, further comprising checking consistency of application files on a cloud prior to deleting the backup.

17. The method of claim 11, further comprising:
    checking consistency of the user data item before the backup.

18. The method of claim 17, further comprising:
    determining whether the backup contains inconsistent data and preventing deletion of the user data item; and
    restoring the user data item from the backup despite user backup settings.

19. The method of claim 11, further comprising:
    prior to validating the user data items, encrypting the user data items on the user device using a private key prior to storing in the backup.

* * * * *